(12) United States Patent
Kishihata

(10) Patent No.: US 10,675,826 B2
(45) Date of Patent: Jun. 9, 2020

(54) PNEUMATIC TIRE

(71) Applicant: The Yokohama Rubber Co., Ltd., Minato-ku, Tokyo (JP)

(72) Inventor: Kazuaki Kishihata, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 224 days.

(21) Appl. No.: 15/561,972

(22) PCT Filed: Mar. 24, 2016

(86) PCT No.: PCT/JP2016/059328
§ 371 (c)(1),
(2) Date: Sep. 26, 2017

(87) PCT Pub. No.: WO2016/152961
PCT Pub. Date: Sep. 29, 2016

(65) Prior Publication Data
US 2018/0126681 A1    May 10, 2018

(30) Foreign Application Priority Data
Mar. 26, 2015 (JP) ................. 2015-064851

(51) Int. Cl.
*B29D 30/06* (2006.01)
*B60C 11/00* (2006.01)
(Continued)

(52) U.S. Cl.
CPC ..... *B29D 30/0633* (2013.01); *B29D 30/0681* (2013.01); *B29D 30/38* (2013.01);
(Continued)

(58) Field of Classification Search
CPC ....................................... B60C 9/22; B60C 5/08; B60C 11/005; B60C 13/00; B60C 13/009; B29D 30/38; B29D 2030/383
See application file for complete search history.

(56) References Cited

U.S. PATENT DOCUMENTS 5,221,382 A * 6/1993 Sid-Ahmed ........... B60C 9/0042
152/451
6,257,290 B1 * 7/2001 Sakamoto ............. B60C 1/0016
152/209.16
(Continued)

FOREIGN PATENT DOCUMENTS

JP   H06-071781   3/1994
JP   2001-121905  5/2001
(Continued)

OTHER PUBLICATIONS

Schultze-Gebhardt, Fritz, Fibers, 1. Survey, 2008, Ullmann's Fibers, vol. 1, 2008, pp. 16-18 (Year: 2008).*
(Continued)

*Primary Examiner* — Jacob T Minskey
*Assistant Examiner* — Virak Nguon
(74) *Attorney, Agent, or Firm* — Thorpe North & Western

(57) ABSTRACT

The present technology provides a pneumatic tire that can improve air dispersibility during vulcanizing at the interfaces of a plurality of types of rubber layers integrally formed by rolling or extruding, and that can effectively suppress blister defects. In a pneumatic tire where a plurality of types of rubber layers integrally formed by rolling or extruding, at least one strand of thread is provided at an interface of the plurality of types of rubber.

14 Claims, 4 Drawing Sheets

(51) Int. Cl.
  *B60C 13/00* (2006.01)
  *B60C 5/08* (2006.01)
  *B60C 9/22* (2006.01)
  *B60C 5/00* (2006.01)
  *B29D 30/38* (2006.01)
  *B29D 30/14* (2006.01)
  *B60C 1/00* (2006.01)

(52) U.S. Cl.
  CPC ............ *B60C 5/00* (2013.01); *B60C 5/08* (2013.01); *B60C 9/22* (2013.01); *B60C 11/00* (2013.01); *B60C 11/005* (2013.01); *B60C 13/00* (2013.01); *B60C 13/009* (2013.01); *B29D 30/14* (2013.01); *B60C 1/0008* (2013.01); *B60C 1/0041* (2013.01)

(56) References Cited

U.S. PATENT DOCUMENTS

| | | | |
|---|---|---|---|
| 2001/0020507 A1 | 9/2001 | Pereira et al. | |
| 2002/0074077 A1* | 6/2002 | Ikeda | B29D 30/72 |
| | | | 156/123 |
| 2003/0155059 A1* | 8/2003 | Noel | B60C 9/0042 |
| | | | 152/527 |
| 2004/0211504 A1 | 10/2004 | Pereira et al. | |
| 2009/0320984 A1* | 12/2009 | Maehara | B60C 9/0042 |
| | | | 152/517 |
| 2012/0193010 A1 | 8/2012 | Fukumoto | |
| 2014/0190617 A1* | 7/2014 | Adachi | B29D 30/36 |
| | | | 156/117 |
| 2016/0075180 A1 | 3/2016 | Kon et al. | |

FOREIGN PATENT DOCUMENTS

| | | |
|---|---|---|
| JP | 2002-526311 | 8/2002 |
| JP | 2012-131031 | 7/2012 |
| JP | 2012-158064 | 8/2012 |
| JP | 2012-158156 | 8/2012 |
| JP | 2013-180652 | 9/2013 |
| JP | 2015-042512 | 3/2015 |
| WO | WO 2000/20233 | 4/2000 |
| WO | WO 2012/070265 | 5/2012 |
| WO | WO 2013/035555 | 3/2013 |
| WO | WO 2014/171462 | 10/2014 |

OTHER PUBLICATIONS

International Search Report for International Application No. PCT/JP2016/059328 dated Jun. 21, 2016, 4 pages, Japan.

* cited by examiner

PNEUMATIC TIRE

TECHNICAL FIELD

The present technology relates to a pneumatic tire having a plurality of types of rubber layers integrally formed by rolling or extruding, and in further detail, relates to a pneumatic tire that can improve air dispersibility during vulcanizing at an interface of these rubber layers, and that can effectively suppress blister defects.

BACKGROUND ART

A vulcanizing defect referred to as blister defect may occur when vulcanizing a pneumatic tire. Blister defects are defects where water and residual air that are included in the rubber, as well as the air remaining at steps formed at an end part of a tire component when forming the tire are locally collected during vulcanizing, and the resulting air bubbles are not completely dispersed during vulcanizing, and cause blisters that remain in the tire. The moisture and residual air that are included in the rubber form countless bubbles during the initial stage of vulcanization, and most of the bubbles are eliminated by microdispersion during vulcanizing. However, air bubbles collect in areas where the pressurizing force is weak during microdispersion, and bubbles may reoccur to form blisters after vulcanizing is complete.

In order to suppress blister defects, the tire component is pressed by a stitcher during tire formation to promote air dispersion, and air is discharged through vent holes provided on the inner surface of the mold during vulcanizing, but the residual air inside the tire cannot be sufficiently discharged simply by this method.

In response, and based on the finding that air pockets are easily formed between the carcass layer and members adjacent thereto, there is a proposal to provide an organic fiber cord for absorbing air that is not covered with rubber on at least one surface of the carcass layer, and the residual air between the carcass layer and the adjacent members is absorbed by this organic fiber cord, and thus the formation of air pockets during vulcanizing can be prevented (for example, refer to International Patent Application Publication No. WO 2013/035555).

However, if the organic fiber cord for absorbing air which is not rubber coated is provided on at least one surface of the carcass layer as described above, while the residual air between the carcass layer and the adjacent members can be absorbed, at the present, blister defects cannot necessarily be effectively suppressed. Furthermore, if the organic fiber cord for absorbing air that is not rubber coated is provided on the surface of the carcass layer, there is a possibility that the organic fiber cord will detach or become misaligned during the tire forming step.

SUMMARY

The present technology provides a pneumatic tire that can improve air dispersibility during vulcanizing at the interfaces of a plurality of types of rubber layers integrally formed by rolling or extruding, and that can effectively suppress blister defects.

The pneumatic tire of the present technology is a pneumatic tire with a plurality of types of rubber layers integrally formed by rolling or extruding, wherein at least one strand of thread is provided at an interface with the plurality of types of rubber.

As a result of extensive studies into blister defects that occur during vulcanizing, the present inventors discovered that blister defects will easily occur at the interface of the rubber layers in a pneumatic tire that has a plurality of types of rubber integrally formed by rolling or extruding, and thus achieved the present technology.

In other words, the present technology can improve air dispersibility during vulcanizing at the interface of rubber layers by providing at least one strand of thread at an interface of a plurality of types of rubber layers integrally formed by rolling or extruding, and can effectively suppress blister defects. Furthermore, when providing the thread at the interface of the plurality of types of rubber layers integrally formed by rolling or extruding, detaching and misaligning of the thread will not occur during the tire forming step, and therefore there is also an advantage that the tire forming step can be smoothly performed.

With a pneumatic tire having a cap tread rubber layer and an undertread rubber layer integrally formed by extruding, at least one strand of thread is preferably provided at the interface between the cap tread rubber layer and the undertread rubber layer. Therefore, the air that collects at the interface between the cap tread rubber layer and the undertread rubber layer during vulcanizing can be dispersed by the thread.

In particular, with regard to a distance A from an outer end position of the undertread rubber layer to the tire centerline, a thread is preferably provided in a region corresponding to 30% of distance A from the outer end position of the interface between the cap tread rubber layer and the undertread rubber layer. The tire shoulder part easily forms air bubbles because the pressurizing force during microdispersion is weak during the initial stage of vulcanization, but blistered defects can be effectively suppressed by providing a thread in the aforementioned region A.

With a pneumatic tire having a tread rubber layer and an edge rubber layer integrally formed by extruding, at least one strand of thread is preferably provided at the interface between the tread rubber layer and the edge rubber layer. Therefore, the air that collects at the interface between the tread rubber layer and the edge rubber layer during vulcanizing can be dispersed by the thread. The tire shoulder part easily forms air bubbles because the pressurizing force during microdispersion is weak during the initial stage of vulcanization, but blistered defects can be effectively suppressed by providing a thread in the aforementioned region.

With a pneumatic tire having a side rubber layer and a rim cushion rubber layer integrally formed by extruding, at least one strand of thread is preferably provided at the interface between the side rubber layer and the rim cushion rubber layer. Therefore, the air that collects at the interface between the side rubber layer and the rim cushion rubber layer during vulcanizing can be dispersed by the thread. The rim cushion part easily forms air bubbles because the pressurizing force during microdispersion is weak during the initial stage of vulcanization, but blistered defects can be effectively suppressed by providing a thread in the aforementioned region.

With a pneumatic tire having an inner liner layer and a tie rubber layer integrally formed by rolling, at least one strand of thread is preferably provided at the interface between the inner liner layer and the tie rubber layer. Therefore, the air that collects at the interface between the inner liner layer and the tie rubber layer during vulcanizing can be dispersed by the thread.

With the present technology, the thread is preferably provided to extend in the circumferential direction of the tire. If the thread is inserted during an extruding step or a rolling step, the thread can easily be continuously inserted so as to extend along the extruding direction or the rolling direction. As a result, a structure can be obtained where the thread is oriented in the tire circumferential direction. Furthermore, if the thread is provided so as to extend in the circumferential direction of the tire, the air remaining between the rubber layers can be effectively dispersed along the tire circumferential direction.

The breaking strength of the thread is preferably 100 N or less. The thread is provided to improve the air dispersibility and is not a reinforcing member, so the effect on the behavior of the rubber layer can be suppressed to a minimum by specifying the upper limit of the breaking strength.

The cord density of the thread is preferably 5 strands/50 mm or less. The thread is provided to improve the air dispersibility and is not a reinforcing member, so the effect on the behavior of the rubber layer can be suppressed to a minimum by specifying the upper limit of the cord density.

DETAILED DESCRIPTION

Figure 1:
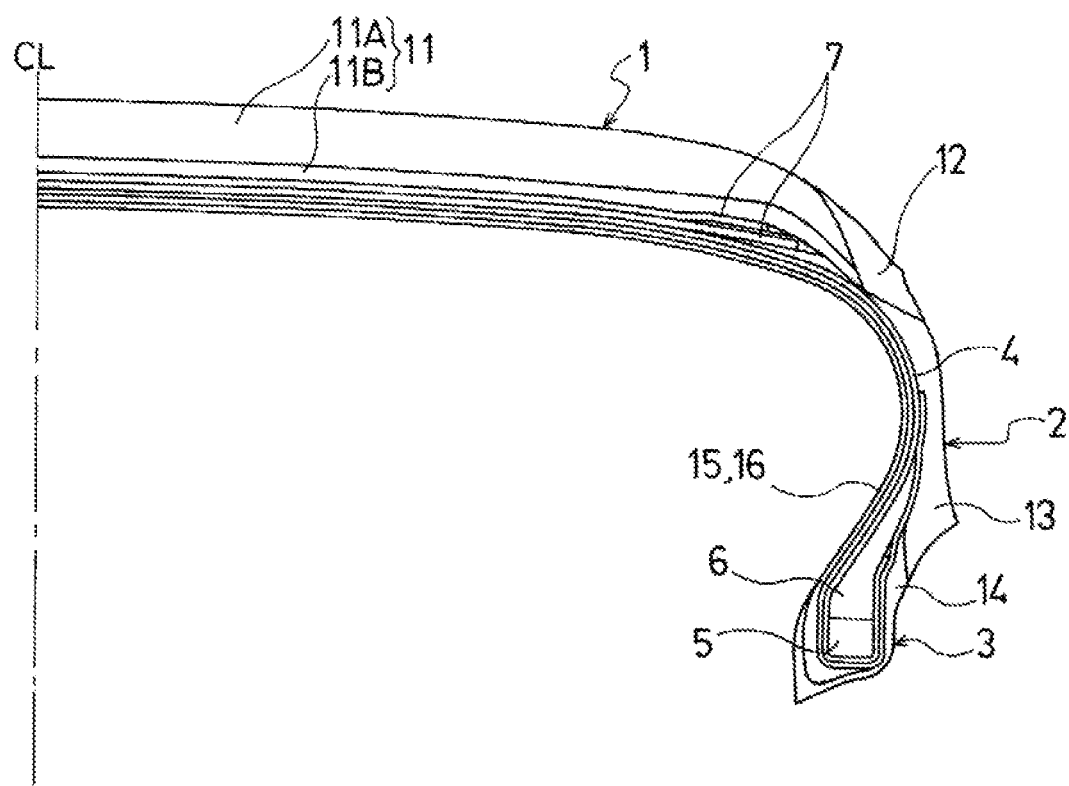
FIG. 1 is a meridian cross-sectional view illustrating the pneumatic tire according to an embodiment of the present technology.
Figure 2:
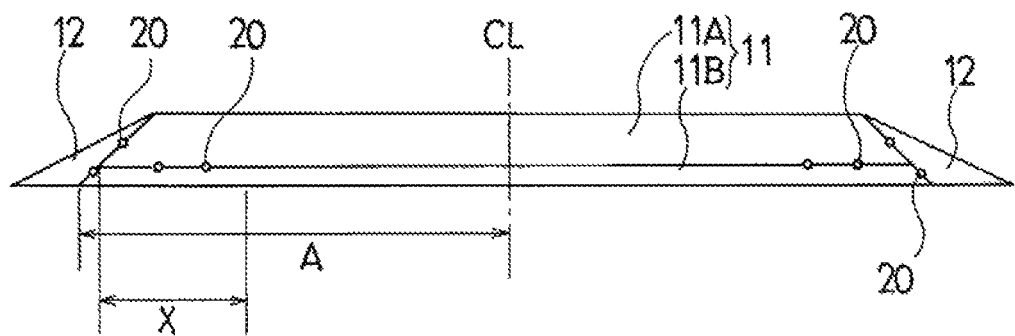
FIG. 2 is a cross sectional view illustrating the tread rubber layer and the edge rubber layer with thread inserted at the interface.
Figure 3:
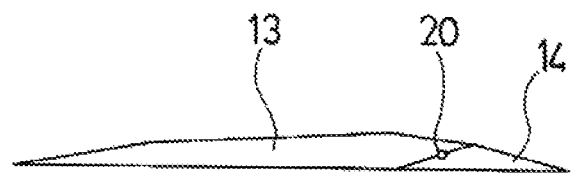
FIG. 3 is a cross sectional view illustrating the side rubber layer and the rim cushion rubber layer with thread inserted at the interface.
Figure 4:
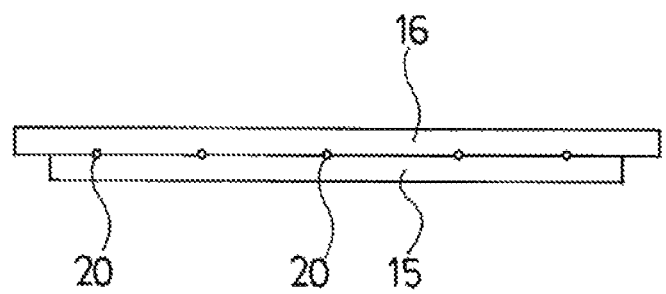
FIG. 4 is a cross sectional view illustrating the inner liner layer and the tie rubber layer with thread inserted at the interface.

The configuration of the present technology is described below in detail while referring to the attached drawings. FIG. 1 illustrates a pneumatic tire according to an embodiment of the present technology, and FIG. 2 to FIG. 4 illustrates the main components of the pneumatic tire. FIG. 1 illustrates only a portion of one side of the tire centerline CL, but this pneumatic tire has a configuration that also corresponds to the other side of the tire centerline CL.

In FIG. 1, 1 is a tread portion, 2 is a sidewall portion, and 3 is a bead portion. Two carcass layers 4 including a plurality of reinforcing cords extending in a tire radial direction are laid between a pair of left and right bead portions 3,3. Ends of the carcass layers 4 are folded around a bead core 5 from a tire inner side to a tire outer side. A bead filler 6 formed from a rubber composition having a high degree of hardness is disposed on peripheries of the bead core 5, and the bead filler 6 is encompassed by the carcass layer 4.

A plurality of belt layers 7 is embedded on the outer circumferential side of the carcass layer 4 in the tread portion 1. These belt layers 7 include a plurality of reinforcing cords that are inclined with respect to the tire circumferential direction and the reinforcing cords are disposed so that the reinforcing cords of each layer are orientated so as to intersect each other.

A tread rubber layer 11 is disposed on an outer circumferential side of the belt layer 7 in the tread portion 1. The tread rubber layer 11 is configured of a cap tread rubber layer 11A that is exposed on an outer surface of the tire and an undertread rubber layer 11B located on an inward side in the tire circumferential direction of the cap tread rubber layer 11A. Furthermore, edge rubber layers 12 are provided on both outer sides in the tire width direction of the tread rubber layer 11. The cap tread rubber layer 11A, undertread rubber layer 11B, and edge rubber layer 12 are integrally formed by extruding, and later are provided to the tire molding step as an integral tire component (refer to FIG. 2).

Furthermore, a side rubber layer 13 is provided on the outer side in the tire width direction of the carcass layers 4 in each sidewall portion 2, and a rim cushion rubber layer 14 that is adjacent to the side rubber layer 13 is provided in the bead portion 3. The side rubber layer 13 and the rim cushion rubber layer 14 are integrally formed by extruding, and later are provided to the tire molding step as an integral tire component (refer to FIG. 3).

Furthermore, a multilayer structure containing an inner liner layer 15 and a tie rubber layer 16 is provided along the carcass layer 4 on the tire inner surface. The inner liner layer 15 is exposed on the tire inner surface, and the tie rubber layer 16 is interposed between the carcass layer 4 and the inner liner layer 15. The inner liner layer 15 and the tie rubber layer 16 are integrally formed by rolling, and later are provided to the tire molding step as an integral tire component (refer to FIG. 4).

With the aforementioned pneumatic tire, at least one strand of thread 20 (refer to FIG. 2 to FIG. 4) is provided at an interface between the plurality of types of rubber layers that are integrally formed by rolling or extruding (for example, a cap tread rubber layer 11A, an undertread rubber layer 11B, edge rubber layer 12, side rubber layer 13, rim cushion rubber layer 14, inner liner layer 15, tie rubber layer 16).

If the pneumatic tire configured in this manner is to be vulcanized, the unvulcanized tire that was molded in the tire molding step is placed in a mold, and the tire is heated with pressure applied from the tire inner side using a bladder. At this time, the moisture and air remaining inside the tire will create bubbles at the initial stage of vulcanization, but most of the bubbles will be microdispersed and eliminated during vulcanization. However, air bubbles will locally collect in areas where the pressurizing force is weak during microdispersion. In contrast, the present technology can improve air dispersibility during vulcanizing at the interface of rubber layers by providing at least one strand of thread 20 at an interface of a plurality of types of rubber layers integrally formed by rolling or extruding, and can effectively suppress blister defects. Furthermore, when providing the thread 20 at the interface of the plurality of types of rubber layers integrally formed by rolling or extruding, detaching and misaligning of the thread 20 will not occur during the tire forming step, and therefore the tire forming step can be smoothly performed.

The configuration is described below in greater detail. If a cap tread rubber layer 11A and an undertread rubber layer 11B are integrally formed by extruding, at least one strand of thread 20 is preferably provided at the interface between the cap tread rubber layer 11A and the undertread rubber layer 11B, as illustrated in FIG. 2. In FIG. 2, the thread 20 extends in the tire circumferential direction, and is provided so as to extend along the entire region of the tire circumferential direction. Therefore, the air that collects at the interface between the cap tread rubber layer 11A and the undertread rubber layer 11B during vulcanizing can be dispersed in the tire circumferential direction by the thread 20.

In particular, with regard to a distance A from an outer end position of the undertread rubber layer 11B to the tire centerline CL, a thread 20 can be selectively provided in a region X corresponding to 30% of distance A from the outer end position of the interface between the cap tread rubber layer 11A and the undertread rubber layer 11B. The tire shoulder part easily forms air bubbles because the pressurizing force during microdispersion is weak during the initial stage of vulcanization, but blistered defects can be effectively suppressed by providing a thread 20 in the aforementioned region A. Herein, the thread 20 can also be provided at a position away from the region X, but if the thread 20 is selectively provided in the region X corresponding to 30% of distance A, dispersion of air can be most effectively achieved. The distance A and the region X are specified in a condition where the cap tread rubber layer 11A and the undertread rubber layer 11B are spread open on a flat surface.

Furthermore, if the tread rubber layer 11 and the edge rubber layer 12 are integrally formed by extruding, as illustrated in FIG. 2, at least one strand of thread 20 can be provided at the interface between the tread rubber layer 11 and the edge rubber layer 12, similar to the foregoing. Therefore, the air that collects at the interface between the tread rubber layer 11 and the edge rubber layer 12 during vulcanizing can be dispersed by the thread 20 in the tire circumferential direction. The tire shoulder part easily forms air bubbles because the pressurizing force during microdispersion is weak during the initial stage of vulcanization, but blistered defects can be effectively suppressed by providing a thread 20 in the aforementioned region. The tread rubber layer 11 can be a multilayer structure including a cap tread rubber layer 11A and an undertread rubber layer 11B made of mutually different rubber compositions, or can be configured from a single type of rubber composition.

Furthermore, if the side rubber layer 13 and the rim cushion rubber layer 14 are integrally formed by extruding, as illustrated in FIG. 3, at least one strand of thread 20 can be provided at the interface between the side rubber layer 13 and the rim cushion rubber layer 14. In FIG. 3, the thread 20 extends in the tire circumferential direction, and is provided so as to extend along the entire region of the tire circumferential direction. Therefore, the air that collects at the interface between the side rubber layer 13 and the rim cushion rubber layer 14 during vulcanizing can be dispersed in the tire circumferential direction by the thread 20. The rim cushion part easily forms air bubbles because the pressurizing force during microdispersion is weak during the initial stage of vulcanization, but blistered defects can be effectively suppressed by providing a thread 20 in the aforementioned region.

Furthermore, if an inner liner layer 15 and a tie rubber layer 16 are integrally formed by rolling, at least one strand of thread 20 can be provided at the interface between the inner liner layer 15 and the tie rubber layer 16, as illustrated in FIG. 4. In FIG. 4, the thread 20 extends in the tire circumferential direction, and is provided so as to extend along the entire region of the tire circumferential direction. Therefore, the air that collects at the interface between the inner liner layer 15 and the tie rubber layer 16 during vulcanizing can be dispersed by the thread 20.

With the aforementioned pneumatic tire, the thread 20 is preferably provided to extend in the circumferential direction of the tire, but other orientations are also possible. If the thread 20 is inserted during an extruding step or a rolling step, the thread 20 can easily be continuously inserted such that the thread 20 extends along the extruding direction or the rolling direction. As a result, a structure can be obtained where the thread 20 is oriented in the tire circumferential direction.

The breaking strength of the thread 20 is preferably 100 N or less, and more preferably 1 N to 5 N. The thread 20 is provided to improve the air dispersibility and is not a reinforcing member, so the effect on the behavior of the rubber layer can be suppressed to a minimum by specifying the upper limit of the breaking strength. If the breaking strength of the thread 20 is too high, there is a possibility of having a negative effect on the tire forming process.

The component material of the thread 20 is not particularly restricted, but for example, synthetic fiber such as nylon, polyester, rayon, and the like, or natural fibers such as cotton or the like can be used. Furthermore, the total linear density of the thread 20 is preferably within a range of 25 dtex to 170 dtex. Thereby, favorable air dispersibility can be ensured while keeping the breaking strength low.

The cord density of the thread 20 can be 5 strands/50 mm or less. The thread 20 is provided to improve the air dispersibility and is not a reinforcing member, so the effect on the behavior of the rubber layer can be suppressed to a minimum by specifying the upper limit of the cord density. If the cord density of the thread 20 is too high, there is a possibility of having a negative effect on the tire forming process. The cord density of the thread 20 is specified by a mutual interval of the thread 20. For example, if the mutual interval of the thread 20 is P mm, the cord density (strand/50 mm) of the thread 20 will be 50/P. Furthermore, if the cord count of the thread 20 at the interface is 1 strand, the cord density can be considered to be 5 strands/50 mm or less.

EXAMPLES

The tire of Example 1 was fabricated in a pneumatic tire with a tire size of 225/65 R17 with 2 strands of thread provided at the interface between the cap tread rubber layer and the undertread rubber layer, 2 strands of thread provided at the interface between the tread rubber layer and the edge rubber layer, and 8 strands of thread provided at the interface between the side rubber layer and the rim cushion rubber layer. Furthermore, a tire according to the Conventional Example 1 was fabricated with the same structure as Example 1 except that the thread was not provided at the interfaces between the rubber layers.

In Example 1, with regard to a distance A from an outer end position of the undertread rubber layer to the tire centerline, a thread was selectively provided in a region corresponding to 30% of distance A from the outer end position of the interface between the cap tread rubber layer and the undertread rubber layer. The thread was made of cotton fiber, and the thread had a total linear density of 29.5 dtex. The breaking strength of the thread was 1 N.

96 tires made by Example 1 and Conventional Example 1 were vulcanized, examined for the presence of blister defects in the tires after vulcanizing, and the occurrence rate of blister defects was determined. The result showed that the tires of Example 1 had a lower occurrence of blister defects on the various areas of the inner surface of the tire such as the shoulder part and rim cushion part, than those of the Conventional Example 1. Furthermore, the occurrence rate of blister defects with Example 1 was approximately 14% of the occurrence rate of blister defects with the Conventional Example 1.

The invention claimed is:
1. A pneumatic tire, comprising: a plurality of types of rubber layers integrally formed by rolling or extruding, wherein at least one strand of thread is provided at an interface with the plurality of types of rubber layers, wherein the at least one strand of thread is separate and spaced apart from a carcass layer of the pneumatic tire.

2. The pneumatic tire according to claim 1, comprising: a cap tread rubber layer and an undertread rubber layer, integrally formed by extruding, as the plurality of types of rubber layers, wherein the at least one strand of thread is provided at the interface between the cap tread rubber layer and the undertread rubber layer.

3. The pneumatic tire according to claim 2, wherein with regard to a distance A from an outer end position of the undertread rubber layer to the tire centerline, the thread is provided in a region corresponding to 30% of the distance A from the outer end position of the interface between the cap tread rubber layer and the undertread rubber layer.

4. The pneumatic tire according to claim 1, comprising: a tread rubber layer and an edge rubber layer, integrally formed by extruding, as the plurality of types of rubber layers, wherein the at least one strand of thread is provided at the interface between the tread rubber layer and the edge rubber layer.

5. The pneumatic tire according to claim 1, comprising: a side rubber layer and a rim cushion rubber layer, integrally formed by extruding, as the plurality of types of rubber layers, wherein at least one strand of thread is provided at the interface between the side rubber layer and the rim cushion rubber layer.

6. The pneumatic tire according to claim 1, comprising: an inner liner layer and a tie rubber layer, integrally formed by rolling, as the plurality of types of rubber layers, wherein the at least one strand of thread is provided at the interface between the inner liner layer and the tie rubber layer.

7. The pneumatic tire according to claim 1, wherein the thread is provided so as to extend in the tire circumferential direction.

8. The pneumatic tire according to claim 1, wherein the breaking strength of the thread is 100 N or less.

9. The pneumatic tire according to claim 1, wherein the cord density of the thread is 5 strands/50 mm or less.

10. The pneumatic tire according to claim 2, wherein the thread is provided so as to extend in the tire circumferential direction.

11. The pneumatic tire according to claim 10, wherein the breaking strength of the thread is 100 N or less.

12. The pneumatic tire according to claim 11, wherein the cord density of the thread is 5 strands/50 mm or less.

13. The pneumatic tire according to claim 1, wherein one of the plurality of types of rubber layers is positioned between the carcass layer and the at least one strand of thread.

14. The pneumatic tire according to claim 1, wherein the at least one strand of thread is not in contact with the carcass layer.

\* \* \* \* \*